(12) United States Patent
Misikangas et al.

(10) Patent No.: US 8,456,364 B2
(45) Date of Patent: Jun. 4, 2013

(54) POSITIONING OF MOBILE OBJECTS BASED ON MUTUALLY TRANSMITTED SIGNALS

(75) Inventors: Pauli Misikangas, Helsinki (FI); Kari Vasko, Helsinki (FI); Arsi Koutaniemi, Vantaa (FI)

(73) Assignee: Ekahau Oy, Helsinki (FI)

( * ) Notice: Subject to any disclaimer, the term of this patent is extended or adjusted under 35 U.S.C. 154(b) by 238 days.

(21) Appl. No.: 12/933,544

(22) PCT Filed: Apr. 2, 2008

(86) PCT No.: PCT/FI2008/050159
§ 371 (c)(1),
(2), (4) Date: Sep. 20, 2010

(87) PCT Pub. No.: WO2009/122000
PCT Pub. Date: Oct. 8, 2009

(65) Prior Publication Data
US 2011/0018769 A1    Jan. 27, 2011

(51) Int. Cl.
*G01S 3/02* (2006.01)
*G01S 5/02* (2010.01)

(52) U.S. Cl.
CPC .................................. *G01S 5/0252* (2013.01)
USPC ........................................................ 342/451

(58) Field of Classification Search
CPC ................................................... G01S 5/0252
USPC ........................................................ 342/451
See application file for complete search history.

(56) References Cited

U.S. PATENT DOCUMENTS

| | | | | |
|---|---|---|---|---|
| 7,359,718 B2 * | 4/2008 | Tao et al. | ................... | 455/456.5 |
| 7,616,156 B2 * | 11/2009 | Smith et al. | ................... | 342/451 |
| 2005/0096068 A1 * | 5/2005 | Bahl et al. | ................... | 455/456.1 |
| 2007/0168127 A1 | 7/2007 | Zaruba et al. | | |
| 2007/0296633 A1 * | 12/2007 | Yanagihara | ................... | 342/463 |

FOREIGN PATENT DOCUMENTS

| | | |
|---|---|---|
| WO | 02/054813 | 7/2002 |
| WO | 03/102622 | 12/2003 |
| WO | 2004/008796 | 1/2004 |

OTHER PUBLICATIONS

International Search Report for International Application No. PCT/FI2008/050159, dated Nov. 26, 2008.
Written Opinion of the International Searching Authority for International Patent Application No. PCT/FI2008/050159 mailed Dec. 5, 2008.
Supplementary European Search Report dated Aug. 31, 2011 for European Patent Application No. EP 08 73 6808.

* cited by examiner

*Primary Examiner* — Gregory C Issing
(74) *Attorney, Agent, or Firm* — Barnes & Thornburg LLP

(57) ABSTRACT

Location estimation for a first target object assisted by a second target object, which have co-located signalling devices is provided. A positioning engine employs a data model of a location-dependent physical quantity and determines location probability distributions for the target objects. One signalling device sends positioning-assisting signals to the other which makes observations from it. The positioning engine uses observations on the physical quantity and the positioning-assisting signals to make a quantity observation set, and determines location probability distributions for the target objects. The positioning engine determines an updated first location probability distribution based on the location probability distributions and the positioning-assisting observation set. The positioning engine determines the location estimate for the first target object based on the updated first location probability distribution and triggers a physical action based on the location estimate for the first target object.

15 Claims, 8 Drawing Sheets

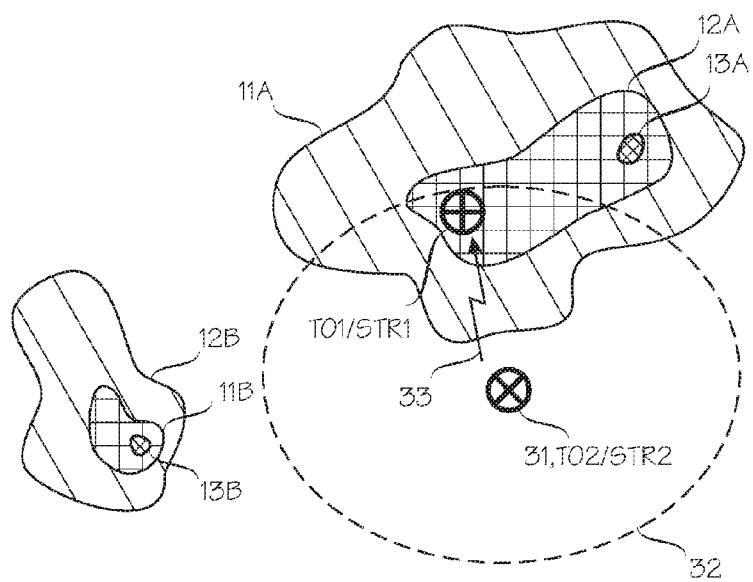
Fig. 3
Apparent probability for location of 1st target (tag):   low  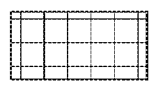 medium   high
Location of target object 1 (eg Tag):    Location of target object 2 (eg PDA):    Estimated tag location: 
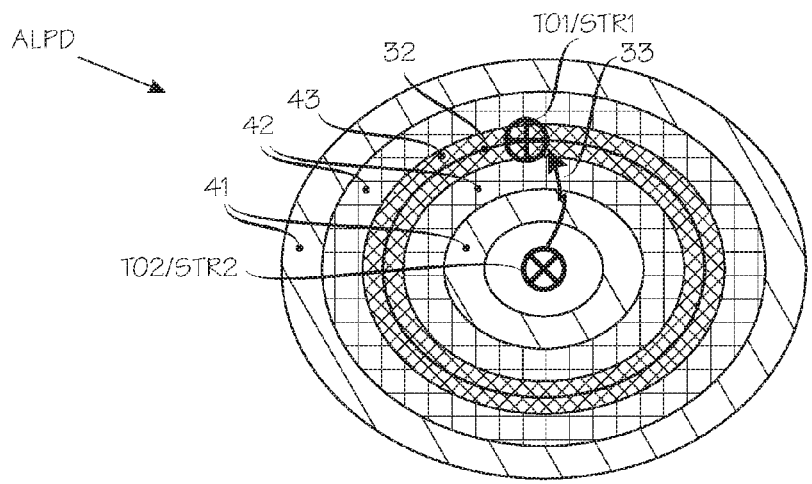
Fig. 4

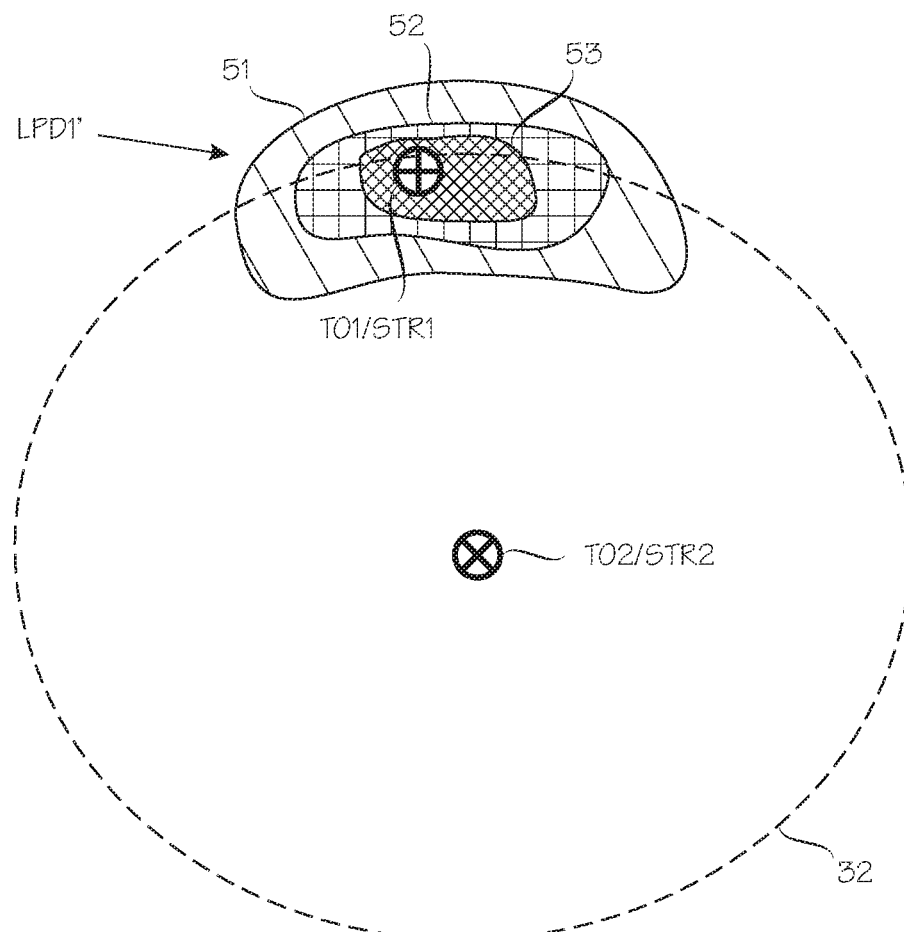

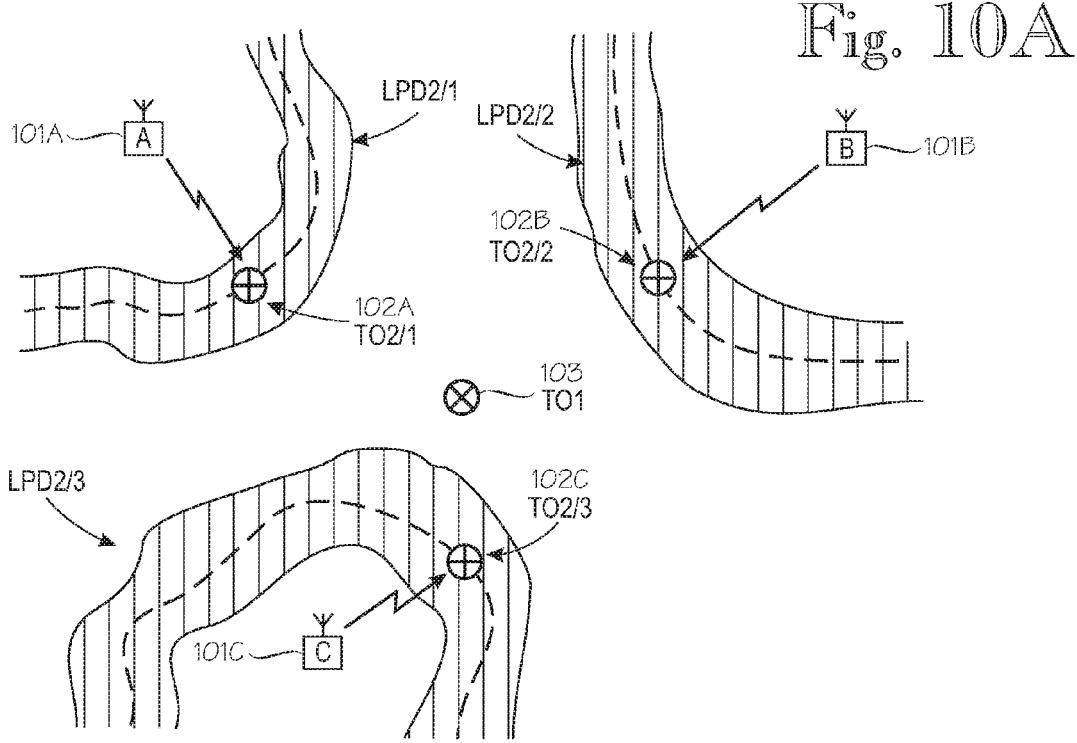
Fig. 10A
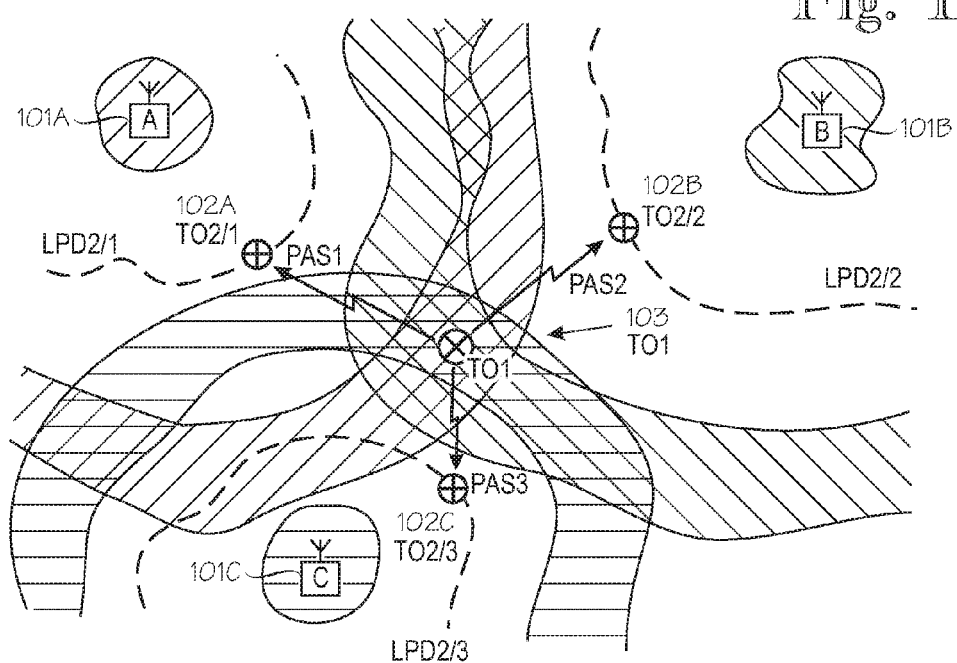
Fig. 10B
High-probability region for:
ALPD/1    ALPD/2    ALPD/3

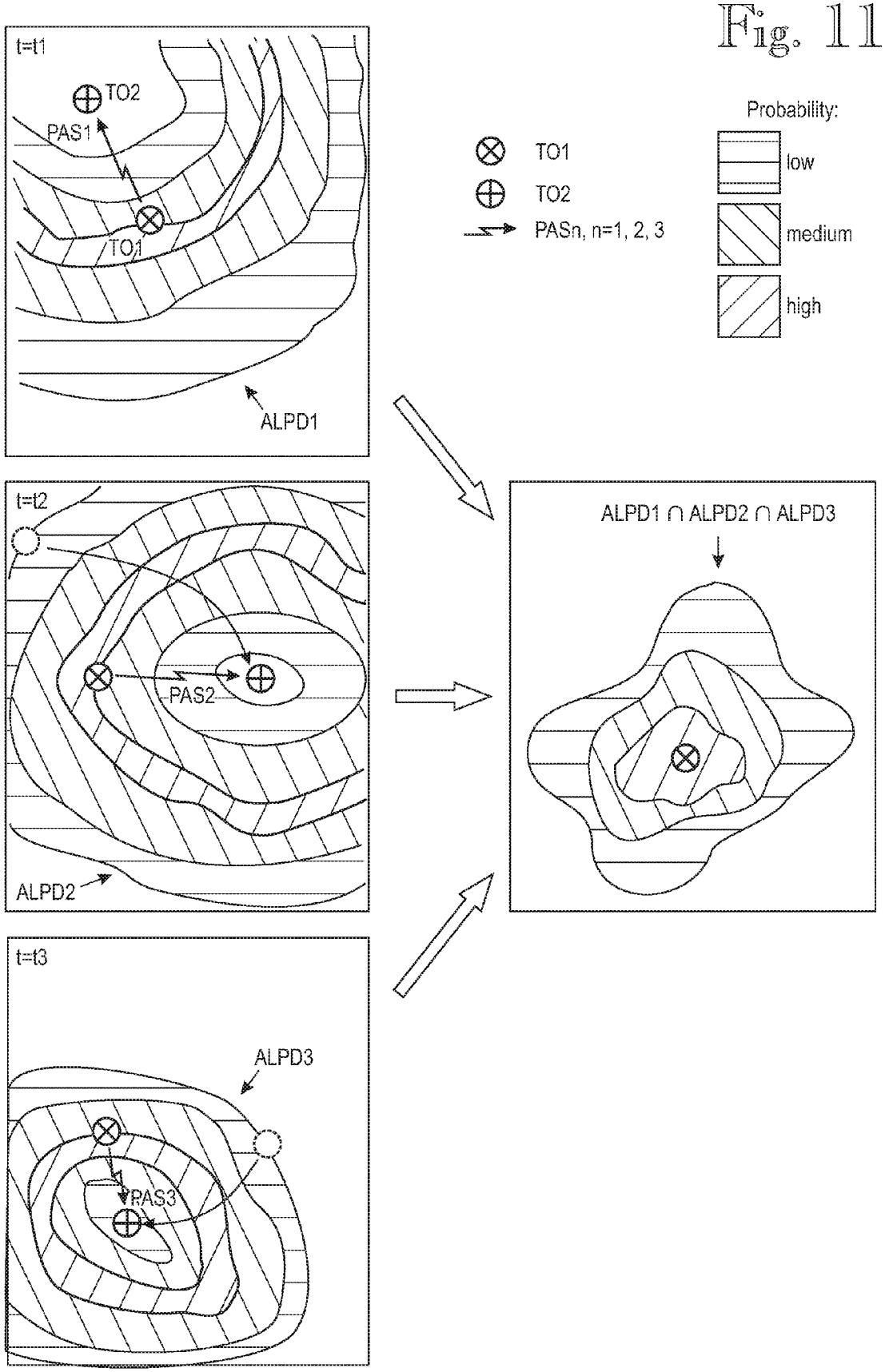

POSITIONING OF MOBILE OBJECTS BASED ON MUTUALLY TRANSMITTED SIGNALS

CROSS-REFERENCE TO RELATED APPLICATIONS

The present application claims the benefit of priority to International Patent Application No. PCT/FI2008/050159 filed 2 Apr. 2008, the content of which is incorporated herein by reference in its entirety.

FIELD OF THE INVENTION

The invention relates generally to techniques for determining a location estimate for a first target object in an environment which also comprises a second target object and wherein at least one location-dependent physical quantity is influenced by the location of the second target object and wherein an initial location estimate for the second target object is determined based on a data model of the at least one location-dependent physical quantity and on observations on the at least one location-dependent physical quantity.

BACKGROUND OF THE INVENTION

An illustrative but non-restrictive application of the present invention relates to location estimation for positioning tags, or briefly "tags". In the present context tags are electronic devices whose principal purpose is to assist estimating the location of more valuable entities co-located with the tags, such as humans or pieces of equipment.

In a representative implementation the tags are operable to measure signal strengths from one or more base stations in a Wireless Local Area Network (WLAN) and to relay the signal strength measurements to a positioning application. In the following, the term positioning engine refers to a combination of the positioning application and the computer apparatus which executes the positioning application. Such techniques are disclosed in commonly-owned patent applications and patents, some of which are listed at the end of the description of the present invention.

In order to estimate a tag's position with sufficient accuracy and reliability, which typically means determining the room where tag is located, the tags should repeat signal strength measurements with sufficient repetition rate, such as with 10-second intervals or less and with sufficient scope, such that one observation (scan of measurable frequencies/channels) includes signal strength measurements from five or more base stations. A large number of measurements is required because signal strengths are subject to strong random fluctuations even in cases where the tag stands perfectly still. The random fluctuations are typically caused by radio-frequency interference and persons or objects moving in the environment, thus causing temporary attenuation in signal propagation. Because of the fluctuations, some of the tag's observations are incomplete, which means that signals from distant or heavily attenuated base stations could not be measured. An observation which lacks signal strength measurements from several base stations may result in gross positioning errors. Such errors are best eliminated by observing several base stations with a high repetition rate.

Unfortunately the requirements to measure several base stations frequently tends to increase battery consumption in the tag. The need to increase the tags' battery lifetime and to lower their manufacturing costs forces manufacturers to settle for a compromise that optimally balances the conflicting requirements of accuracy, cost and battery lifetime.

One strategy for extending battery lifetime is to enable the tag to spend most of the time in a sleep mode wherein most of its circuitry is shut off. The tag's normal operation is resumed in response to a timer alert, motion detection by a motion sensor, or the tag may have a pushbutton for that purpose. When the tag wakes up for a scanning operation, it sends a probe request message to one WLAN channel at a time and remains on that channel for some time in order to receive responses from the base stations. Each base station, which serves the channel on which the probe request message was sent and which is able to receive the message, responds by sending a probe respond message. If the tag is able to receive a base station's probe respond message, it is able to measure that base station's signal strength in the place where the tag is located. After scanning all pre-configured channels, the tag compiles the signal strength measurements from all base stations and sends the compiled signal strength measurements to the positioning engine which determines or updates the tag's location estimate. After this, the tag re-enters sleep mode. The sleep mode is an effective strategy for extending the tag's battery life, but it causes problem in finding the tag during sleep mode.

Another positioning problem is caused by the fact that the bandwidth requirements of WLAN networks or some sections of them may be adequately covered by one or two base stations but such a small number of observable base stations is insufficient for accurate and reliable positioning. This means that although, in principle, the tags can be positioned by using signals of base stations which exist for the sake of communication, it is not uncommon that existing WLAN networks must be complemented by adding and/or relocating base stations to meet the requirements of accurate and reliable positioning. A further problem is that the effect of the added and/or relocated base stations is difficult to predict a priori, and the base station placement tends to require experimentation which in turn requires labour-intensive recalibration of the data model.

Yet another positioning problem is caused by the fact that a tag's measurements may be more or less permanently hindered by obstacles. For instance, a tag put in a metal locker may not even attach to any base stations, which prevents it from sending its observations even if the tag is able to make observations. Such a tag may be completely lost until it is taken out from the metal locker.

Yet another positioning problem is caused by the fact that a tag may be in a place which has no WLAN network coverage. For instance, the network may suffer from design errors and or malfunctioning base stations which cause "dead spots", ie, spots that are not adequately covered by any of the base stations. Alternatively or additionally the tag may be accidentally or intentionally moved outside the network coverage area. For example, a tag may be attached to a patient in a mental hospital and the patient may try to escape the hospital by leaving the building and moving outside the hospital network.

Yet another positioning problem occurs when using ad-hoc networks wherein only a few base stations are placed on fixed positions and the network clients communicate with each other in order to establish a communication network. In this scenario, most of the network clients may be outside the coverage area of the fixed access points. For instance, tags may be used to locate firefighters entering a building in fire, wherein wireless devices carried by the firefighters form an ad-hoc network which is connected to a few fixed base stations residing in fire trucks parked around the building. Thus, wireless devices near the fire trucks communicate to the base stations directly while other devices deeper in the building communicate via other devices.

BRIEF DESCRIPTION OF THE INVENTION

An object of the invention is to develop a method, an apparatus and a software product so as to alleviate one or more of the problems identified above. The object of the invention is achieved by aspects of the invention as defined in the attached independent claims.

An aspect of the invention is a method for determining a location estimate for a first target object in an environment which also comprises a second target object and wherein at least one location-dependent physical quantity is influenced by the location of the second target object.

The method comprises:
maintaining a positioning engine which is operable to model the at least one location-dependent physical quantity with a data model of the environment, to receive observations on the at least one location-dependent physical quantity and to determine location probability distributions for the first and second target object;
associating the first and second target object respectively with a co-located first and second signalling device, wherein at least one signalling device comprises means for sending a positioning-assisting signal and another signalling device comprises means for receiving the positioning-assisting signal and means for making observations from the positioning-assisting signal;
the positioning engine receiving observations on the at least one location-dependent physical quantity;
at least one of the signalling devices sending a positioning-assisting signal, wherein the positioning-assisting signal is received by another signalling device which makes a positioning-assisting observation set from it and sends the positioning-assisting observation set to the positioning engine;
the positioning engine making a quantity observation set based on the received observations on the at least one location-dependent physical quantity;
the positioning engine determining a respective first and a second location probability distribution for the first and second target object, wherein at least the second location probability distribution is based on the data model and the quantity observation set;
the positioning engine determining an updated first location probability distribution based on the first location probability distribution, the second location probability distribution and the positioning-assisting observation set;
the positioning engine determining the location estimate for the first target object based on the updated first location probability distribution; and the positioning engine triggering a physical action based on the location estimate for the first target object.

Another aspect of the invention is a positioning engine, which is a data processing apparatus specially adapted to perform the computations in the above-described method. Yet another aspect of the invention is a computer program product for a data processing system, wherein execution of the computer program product in the data processing system causes the data processing system to implement the above-described positioning engine.

The target objects are something whose location estimates are to be determined. A non-exhaustive list of exemplary target objects includes humans, such as firefighters, miners, medical personnel, patients, children or any other kind of persons whose mobility needs to be monitored or restricted. The list or potential target objects further includes equipment, instruments, shopping carts, or the like. The target objects are able to move or be moved in an environment which exhibits at least one physical quantity which is influenced by the location of the second target object.

The signalling devices associated with the first and second target objects may be similar or different devices. The first target object is the target object whose location estimate is to be determined, while the second target object is the one whose operation and signalling is used to assist locating the first target object.

The at least one location-dependent physical quantity may be any physical value that can be observed and wherein the observed value is influenced by the location of the second target object. In an illustrative but non-restrictive embodiment the physical quantity is based on radio signals and the observed value may be, but is not limited to, "strength of a radio signal transmitted by base station A when observed by the second target object", or "time difference between transmission and arrival of a radio signal transmitted by the second target object and received by base station B". In an alternate embodiment the location-dependent physical quantity indicates visibility of a certain object to a certain observer. For instance, the physical quantity may be based on an infrared transmitter at a known location, and the observed value could be "indication of whether infrared signals transmitted by the infrared transmitter are visible to the second target object or not (yes/no)". Another example of an observation on a visibility-based quantity is "estimated distance and direction of a target object from a camera placed at a known location", wherein the target object is identified from a video signal using image recognition and the distance estimate is based on prior knowledge of physical dimensions of the target object.

In some embodiments, more than one location-dependent physical quantity may be used. In one illustrative but non-restrictive embodiment, the environment comprises a communication network, such as WLAN, wherein communication is effected using signals which have one or more location-dependent signal parameters, which are typically radiometric signal quality values, such as signal strength, signal-to-noise ratio, bit error rate/ratio, timing advance or the like. WLAN networks typically comprise multiple base stations and each measurable signal parameter for a signal transmitted or received by a base station can be interpreted as a separate location-dependent physical quantity. A benefit of this embodiment is that the signalling devices associated and co-located with the target objects only need to observe signal strength in the WLAN network, which WLAN transceivers routinely do, although not for positioning purposes.

The influence of the target objects' location on the physical quantity is modelled by means of a data model. The data model is operatively coupled with a positioning engine which determines location probability distributions for the target objects. In an illustrative but non-restrictive embodiment the data model is a probabilistic model comprising probability distributions for observations on the physical quantity at several locations in the environment. In an alternate embodiment, the data model comprises locations and properties of base stations and information of obstacles affecting radio signals transmitted or received by the base stations. In yet another embodiment, the data model comprises locations of video cameras and a database containing information about target objects needed for image recognition. It should be apparent to a person skilled in the art that the exact nature of the physical quantity or the data model is not essential for this invention, as long as the influence of the target objects' location on the quantity can be modelled by the data model with reasonable accuracy.

In order to determine the second location probability distribution for the second target object, the positioning engine needs to receive one or more observations on the at least one physical quantity influenced by the second target object. In some embodiments, the observations are made and sent to the positioning engine by a sensing device co-located with the second target object. For instance, the sensing device may be a WLAN transceiver which makes observations on WLAN signals transmitted by one or more WLAN base stations, and sends the observed signal values to the positioning engine. In alternate embodiments, one or more base stations make observations on signals transmitted by a device co-located with the second target object. In yet another embodiment, observations are generated and sent to the positioning engine by a system receiving live video signal from a camera at a known location and wherein the observations are based on image recognition. It should be apparent to a person skilled in the art that it is not essential for this invention who makes the observation, how many observations are made, when the observations are made, and how the observations are delivered to the positioning engine, as long as the positioning engine has received at least one observation before determining the second location probability distribution.

The positioning engine makes a quantity observation set from the received observations. The quantity observation set may comprise a single observation, or it may be a statistical summary of several observations made at different times and/or received from different sources. In some embodiments making the quantity observation set may involve using sophisticated time-series analysis techniques to determine a representative sample from a sequence of observations. In yet another embodiment, making the quantity observation set may also utilize prior knowledge about the target objects, devices used for making the observations, and/or environment conditions. For instance, the positioning engine may compensate differences between sensing devices by using a normalization function specific to the sensing device type, or take into account changes in power levels of quantity-related base stations. It should be apparent to a person skilled in the art that the exact nature of methods for making the quantity observation set is not essential for this invention, as long as the quantity observation set is based on the received observations and therefore reflects the location of the second target object.

Obviously, the exact location of the first target object in not known precisely beforehand. However, any possible prior information regarding to the location of the first target object is expressed as the first location probability distribution. In case no prior information is available, every location is considered equally probable whereby the first location probability distribution is flat. In an illustrative but non-restrictive embodiment the first location probability distribution is based on expected locations of the first target object. For instance, in case the first target object is a hospital patient, he/she can be expected to spend most of his/her time in his/her own room, so the initial probability for the room can be a little bit higher than for other locations. In alternate embodiment the first probability distribution is based on quantity observations and the data model just like the second location probability distribution. In yet another embodiment, location estimation is a recursive process, wherein the first location probability distribution is based on the updated first location probability distribution determined during the previous recursion step.

A key element of the present invention is the positioning-assisting signal which is sent by at least one of the signalling devices and received by another signalling device, wherein the recipient of the positioning assisting-signal makes a positioning-assisting observation set from the received positioning assisting-signal and sends the positioning-assisting observation set to the positioning engine. The positioning-signal can be transmitted by using any of a wide variety of techniques. For instance, radio, microwave, audio, ultrasound, light, infrared or ultraviolet communication can be used. Moreover, the signalling devices may be based on completely different measurement techniques. The positioning-signal can be sent from the first signalling device to the second signalling device or vice versa, as long as the positioning-assisting observation set reflects the mutual proximity of the signalling devices.

In an illustrative but non-restrictive embodiment the positioning-assisting signal is based on the same technology as the location-dependent quantity. For instance, the positioning-assisting signal and the location-dependent quantity can both be based on WLAN signals in which case the same WLAN transceiver can be used as a signalling device and as a sensing device observing the quantity, and also as sending means for sending the observations to the positioning engine. In an alternate embodiment, the positioning-assisting signal is totally independent from the quantity observations and/or the method used to communicate with the positioning engine. For instance, the quantity observations may be based on infrared signals while the positioning-assisting signal is transmitted using ultrasound frequency and the observation set is sent to the positioning engine using a GPRS link.

The positioning-assisting observation set is utilized by the positioning engine when determining an updated first location probability distribution for the first target object. In an illustrative but non-restrictive embodiment determining the updated first location probability distribution comprises determining an additional location probability distribution based on the positioning-assisting observation set and the second location probability distribution for the second target object. In some embodiments, determining the additional location probability distribution comprises using a signal propagation model to estimate the likelihood of the positioning-assisting observation set for hypothetical locations of the first and second target object. In an alternate embodiment, the updated first location probability distribution is determined as a subset of the first location probability distribution wherein some of the locations indicated possible by the first location probability distribution are rejected based on proximity constraints identified from the positioning-assisting observation set. For instance, in case the positioning-assisting signal indicates very close proximity of target objects, the positioning engine can set a zero or very low probability for each location distant from the estimated location of the second target object.

The positioning engine estimates the location of the first target object using the updated first location probability distribution. In an illustrative but non-restrictive embodiment the location estimate is a single point, which can be determined as the most probable location, a probability-weighted average of all possible locations, the central of the most probable high-probability region, or using any other method for selecting a single location based on a location probability distribution. In an alternate embodiment, the positioning engine may return one or more points and a quality value for each returned point indicating the likelihood that the point represents the correct location of the first target object. In yet another embodiment the location estimate indicates one or more high-probability zones, wherein the zones are specified beforehand and each zone indicates a region within the environment. In general, the location estimate can be anything that can be derived from a location probability distribution, and a person skilled in the art should understand that the exact nature of the location estimate is not essential for this invention.

Finally, the positioning engine triggers one or more physical actions based on the location estimate for the first target object. In an illustrative but non-restrictive embodiment the physical action comprises outputting the location estimate to a physical output device, such as a display or a printer, and/or to a physical storage, such as a database or a file. In alternate embodiment, the positioning engine may trigger an alarm in case the location estimate fulfils some pre-determined alarming conditions. For instance, in a mental hospital a patient's location estimate pointing to a location outside allowed area may trigger a "patient escaping" alarm. It should be apparent to those skilled in art that the exact nature of the triggered physical action is not essential for this invention.

The invention is partially based on the idea that the requirement for accurate and reliable tag positioning varies over time. In most tag positioning applications, the tag's position is virtually irrelevant when nobody needs to find the tag or the object/person co-located with it. Conversely, the need for the tag's position estimate to be accurate and reliable is highest when there is a need to find or locate the tag. The invention is also based on the idea that determination of the location estimate for the target object can be improved by sending and observing positioning-assisting signals between a first target object and a second target object. In such situations it is possible to improve positioning of a first target object by using observations from another location occupied by a second target object. The mutual positioning-assisting signals sent from one mobile target object and received by another mobile target object provides new type of information which has not been utilized in prior art positioning systems.

In a typical application example, the first target object is the one that particularly needs to be located, while the second target object (or more precisely: the second signal transceiver associated and co-located with the second target object) is one which is at least temporarily used to assist positioning the first target object. In principle, the transceivers associated with the first and second target objects can be similar and their location estimates can be determined by using similar techniques, but in a typical application example the first transceiver is a low-cost tag while the second signal transceiver is a more comprehensive communications apparatus, such as a portable or palmtop computer.

In some embodiments the positioning engine and the data model may be installed in some or all of the target objects' co-located and associated signalling devices, such as powerful portable computers. However, a centralized positioning engine which assembles observations in respect of several target objects typically has access to more available information and is subject to fewer resource constraints, such as battery, processing and memory resources. Furthermore, a centralized positioning engine which assembles observations in respect of several target objects can also coordinate the movements of persons carrying the signalling devices in cases wherein a target object must be searched quickly. For instance, the centralized positioning engine may send the signalling devices explicit motion instructions or current positioning data in respect of other signalling devices participating in the search.

In some embodiments a controller is used to define an operation logic for sending the positioning-assisting signal and at least one positioning-assisting signal is sent in response to a transmission request from the controller. For instance, the positioning assisting signal may be sent in response to a preceding positioning-assisting signal sent by the first signalling device. The controller may define an operation logic for sending the preceding positioning-assisting signal and the preceding positioning-assisting signal may be sent in response to a transmission request from the controller. The controller may further adjust the operation logic based on the positioning-adjusting observation set, wherein adjusting the operation logic may comprise adjusting a time interval between consecutive transmission requests. In one implementation the second signalling device responds to the preceding positioning-assisting signal by sending the positioning signal only when there is an indicated need to assist positioning of the first target object. For instance, the need may be indicated by the user of the second signalling device or the operator of the positioning engine.

Thus the reception of the positioning-assisting signal may trigger sending further positioning-assisting signal(s). The reception of the positioning-assisting signal serves as an indication that the target object associated with the signalling device is being searched and it should assist the search by sending further positioning-assisting signal(s).

In an illustrative but non-restricting embodiment, the first signalling device is a low-cost tag which suffers from at least one of the positioning problems described in the background section of this patent specification, while the second signalling device is a palmtop computer or personal digital assistant ("PDA") carried by a person who has indicated a need to find the tag. The latest location estimate for the tag reported by the positioning engine can be displayed on the PDA so that its user can move towards the estimated location and approach the tag, although the estimate is not exactly correct. In order to maximize battery life, the tag spends most of its time in power-saving mode, and it can be scheduled to activate after some interval of time. This embodiment exhibits the additional problem that although positioning-assisting signalling between the tag and the PDA can be used to improve the location estimate for the tag, the location estimate update interval is fully determined by the wake-up interval of the tag, which may be so long that the PDA user searching the tag will be frustrated.

A definite advantage can be achieved by implementing the controller and the operation logic in the tag, preferably in its firmware, so that the tag's scheduled wake-up time is adjusted according to the operation logic. Once the tag is activated, the controller sends a transmission request to a signalling module which causes transmission of a preceding positioning-assisting signal. The PDA receives this signal and responds by sending a positioning-assisting signal because PDA user has indicated a need to assist positioning of the tag, wherein the positioning-assisting signal received by the tag serves as a direct indication for the controller that the tag is being searched. The controller can then adjust the operation logic so that the wake-up interval of the tag is shortened, and this affects the time interval between consecutive transmission requests accordingly. This way the location estimates can be updated much more frequently as the PDA approaches the tag and the PDA user will find the tag faster.

In yet another embodiment, the controller and the operation logic may be used to synchronize positioning-assisting signalling between two or more low-cost tags which all spend most of their time in power-saving mode, which is why they are unable to send or receive positioning-assisting signals at that time. In case all tags follow the same operation logic, they can be scheduled to wake-up simultaneously, to send the positioning-assisting signals and to stay in receiving mode for a while to capture possible positioning-assisting signals from nearby tags. Thus, in this scenario, positioning accuracy and/or efficiency for all tags can be improved significantly because the number of mutual observations and information available to the positioning engine increases according to the number of active tags within the environment.

In some embodiments the data model is a probabilistic data model which indicates a probability distribution for the at least one location-dependent physical quantity for each of several locations in the environment. A benefit of the probability distribution over some other models which only indicate a single representative parameter value is that the probabilistic data model can provide more information than a single numerical value, such as an expected signal strength. For instance, several base stations may have nearly identical representative signal strengths at some location in the environment, but in some cases such base stations can be distinguished from one another by virtue of different probability distributions. A probabilistic data model is also relatively robust in cases wherein the observations are ambiguous or contradictory. The commonly-owned patent applications and patents listed at the end of the description of the present invention disclose various techniques for determining the target object's location on the basis of the data model and the observations made by the target object's co-located signal transceiver.

In case wherein the data model is a probabilistic data model, the step of determining the location probability distribution for a target object proceeds along the following phases. First the positioning engine determines a probability for an observation of the at least one location-dependent physical quantity at a hypothetical location of the target object, based on the probability distribution for the at least one location-dependent physical quantity indicated by the probabilistic data model at the target object's hypothetical location. Then the positioning engine determines a density of the location probability distribution at the target object's hypothetical location based on the probability for the observation of the at least one location-dependent physical quantity at the target object's hypothetical location.

This means that not only is the target object's location but also the at least one location-dependent physical quantity, such as signal strength, is indicated as a probability distribution. A benefit of the probabilistic model over models which merely indicate an expected signal value at a number of calibrated locations is that probability distribution lends itself to weight-ranking calculations with relative ease. In real-life situations the signalling devices rarely if ever observe signal strengths or other physical quantities perfectly identical with those indicated by the data model. If the real-life environment deviates from the model and the model merely indicates one value for several locations, or a set of values, such as a spectral snapshot, the location that best matches with the observations is outputted as the location estimate, and other location candidates are simply omitted.

In some embodiments the positioning engine monitors a location estimate for one or more second target objects and progress of the position-assisting observation sets as a function of the location estimate for the one or more second target objects and wherein the positioning engine further sends the one or more second target objects instructions for changing location based on the progress of the position-assisting observation sets. This embodiment is particularly useful in situations wherein the first target object must be located as soon as possible and all available second target objects are instructed to search the first target object. For example, the first target object may be a person missing or in a hazardous situation and any available persons carrying palmtop computers or other suitable signalling devices are instructed to search for the missing person. The position engine PE preferably keeps track of the motion of the second target object(s) and the progress of the position-assisting observation sets. The position engine PE sends movement instructions based on the monitored progress of the position-assisting observation sets. For instance, if some sections of the environment has been adequately searched and the position-assisting observation sets were consistently very low, this indicates that the first target object is not in or near the section already searched. Accordingly the second target objects should be instructed to move elsewhere. Likewise, if the position-assisting observation sets are strong, this indicates that the first and second target object(s) are relatively close to one another and search should be concentrated in that section of the environment.

BRIEF DESCRIPTION OF THE DRAWINGS

In the following the invention will be described in greater detail by means of specific embodiments with reference to the attached drawings, in which:

FIG. 3 illustrates elimination of positioning ambiguity in respect of the first target object by using observations of the second target object which define a perimeter of probability maxima around the second target object;

FIG. 4 shows how the perimeter shown in FIG. 3 can be generalized to an additional location probability distribution which can be used as additional information for reducing positioning uncertainty;

FIG. 5 shows how positioning uncertainty of target objects can be reduced by using positioning-assisting signal sent from one target object to another;

FIGS. 10A and 10B show how the invention can be used to locate a target object in an ad-hoc network comprising several other target objects; and FIG. 11 shows how the invention can be used to locate a target object using a sequence of positioning-assisting signals.

DETAILED DESCRIPTION OF SPECIFIC EMBODIMENTS

FIGS. 1 through 5 demonstrate the operating principle of the invention by means of gradually progressing schematic illustrations. In order to provide a concrete application example, FIGS. 1 through 5 are based on the assumption that the first target object is a low-cost tag which suffers from the positioning problems described in the background section of this patent specification, while the second target object is a palmtop computer or personal digital assistant ("PDA") having more extensive signal measurement capabilities. For example, a typical PDA's battery is bigger and charged more frequently than a tag's battery, the PDA has more processing power and since it has other uses apart from positioning, it can be provided with more advanced signal processing circuitry. However, the inventive principle can be used to enhance positioning of a first target object by means of observations of a second target object even if the two target objects are equally capable, and the assumption that target object 1 is a tag while target object 2 is a PDA only relates to a typical application example but is not an essential feature of the invention.

Figure 1:
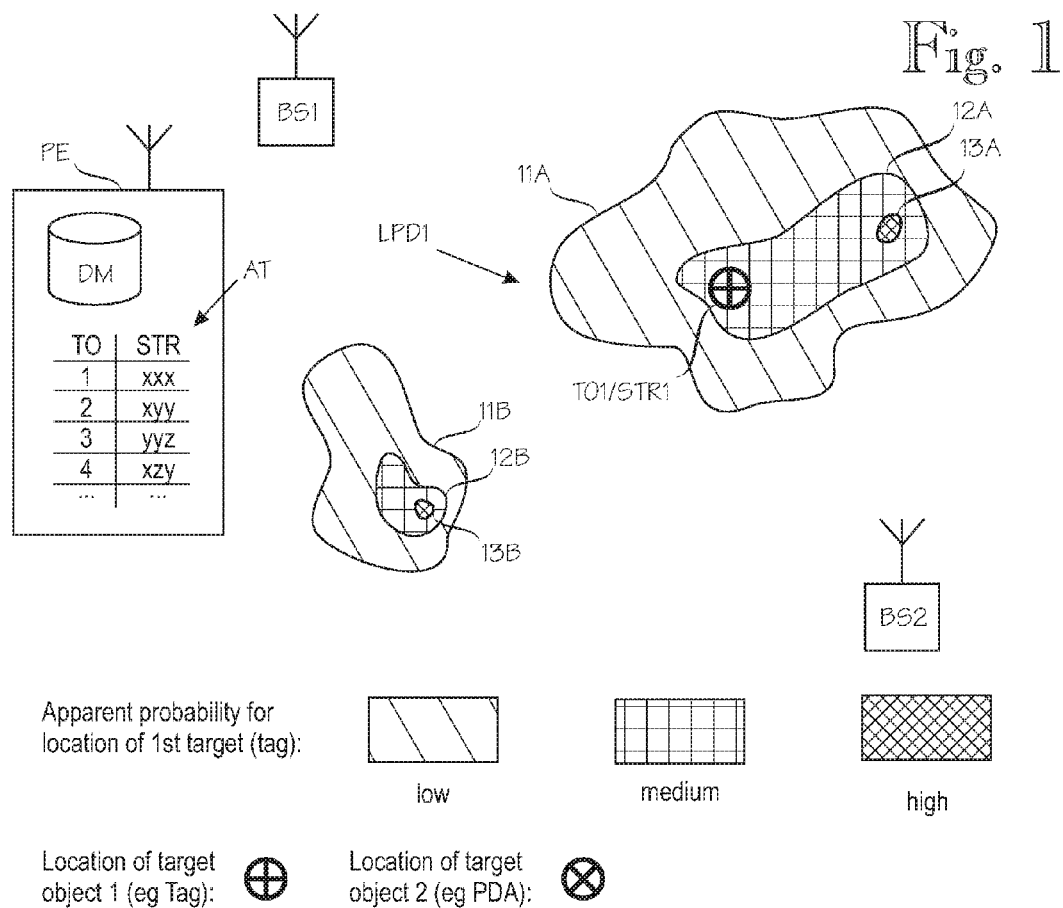
FIG. 1 shows a hypothetical environment wherein a position estimate in respect of a first target object is ambiguous.

FIG. 1 shows a hypothetical environment wherein a position estimate in respect of a positioning tag is ambiguous. Reference sign TO1 denotes a first target object TO1, which is associated with a co-located first signal transceiver STR1, which represents an implementation of a signalling device. The fact that a target object n is associated with a respective signal transceiver n is best described via an example. The target object, which is the real entity of interest, such as a person, animal, valuable instrument, apparatus, document folder or the like, may be located by locating the signal transceiver whose communication identity in the environment (eg WLAN or other network) is associated with the target object. The fact that the target object n is co-located with the respective signal transceiver n means that if the signal transceiver n is found, its associated target object n can be found as well.

In some positioning applications it may not be necessary to treat the target object and its associated signal transceiver separately, and the target object can be the signal transceiver itself. But in some positioning applications valuable information may be gained by modelling the target objects' motion with motion models such as those disclosed in commonly owned patent applications EP 1 796 4191 US 2007/0 149 216.

In the examples described in connection with FIGS. 1 through 5, the signal transceiver STR1 associated with the first target object TO1 is a positioning tag. The tag TO1/STR1 moves or can be moved in an environment in which communication signals are transmitted which have one or more location-dependent parameters, such as signal strength. In a typical WLAN installation such signals are transmitted by WLAN base stations BS1, BS2 at fixed locations. FIG. 1 shows two exemplary base stations but reliable positioning in complex environments requires more than two base stations. The location-dependence of the signal parameters is modelled with a probabilistic data model DM of the environment. Although the base stations are fixed, their precise locations need not be known. Instead the probabilistic data model DM indicates a probability distribution for the location-dependent parameters at several locations in the environment. The probability distribution for the location-dependent parameters can be determined via any combination of applicable techniques, such as calibration, propagation modelling (ray tracing) and/or interpolation/extrapolation from known locations. The term "sample point" refers to a location at which the probability distribution for the location-dependent parameters is known.

As described earlier, the positioning engine may utilize any available prior information on the location of the first target object in form of a location probability distribution LPD1. This prior information is not mandatory, however. In case nothing is known or assumed beforehand, every location is considered equally probably, which can be expressed as a flat location probability distribution. However, in the preferred embodiment, location probability distributions for each target object are based on observations on location-dependent quantities, which will yield the best positioning accuracy. Therefore the example scenarios illustrated in FIGS. 1 to 5 are based on the assumption that the initial location probability distribution for the first target object is determined using observations on base station signals.

The target object TO1/STR1 observes the location-dependent parameters of the communication signals from the base stations and relays its observations to a positioning apparatus, called positioning engine PE. The positioning engine PE uses the target object's observations and the probabilistic data model DM to determine a location probability distribution LPD1 for the target object TO1/STR1. Reference sign AT denotes an association table that links any target object to its associated and co-located transceiver. Techniques for setting up and maintaining the positioning engine PE and the probabilistic data model DM are disclosed in the reference documents listed at the end of this specification and particularly in WO03/102622.

In an ideal world the location-dependent parameters, such as signal strength from base station BSn, would decrease smoothly from the base stations and a signal strength of x would imply a circle of some radius y around the base station BSn. In a real-world situation, however, building infrastructure distorts the signal strength-versus-distance dependency and the target object's location, as estimated in the form of the location probability distribution LPD1, typically has an irregular shape. In the hypothetical example shown in FIG. 1, the location probability distribution LPD1 has two local peaks which are denoted by reference signs 13A and 13B. The local peaks are surrounded by moderate-probability areas 12A and 12B, which in turn are surrounded by low-probability areas 11A and 11B. Any non-shaded area has a virtually zero probability, ie, a probability lower than some epsilon value, to be the target object's location. The presence of multiple peaks makes the position estimate ambiguous. One should keep in mind that any discussion of probability or location relates to apparent probability or location as seen from the point of view of the positioning engine PE, because of the random fluctuations discussed in the background section of this patent specification. In other words, the true locations of the target objects are shown in FIGS. 1 through 5 only to facilitate description of the invention, but the positioning engine PE does not know the target objects' true locations. In this example the random fluctuations have the consequence that the true location of the tag TO1/STR1 does not reside in either of the high-probability areas 13A, 13B.

Figure 2:
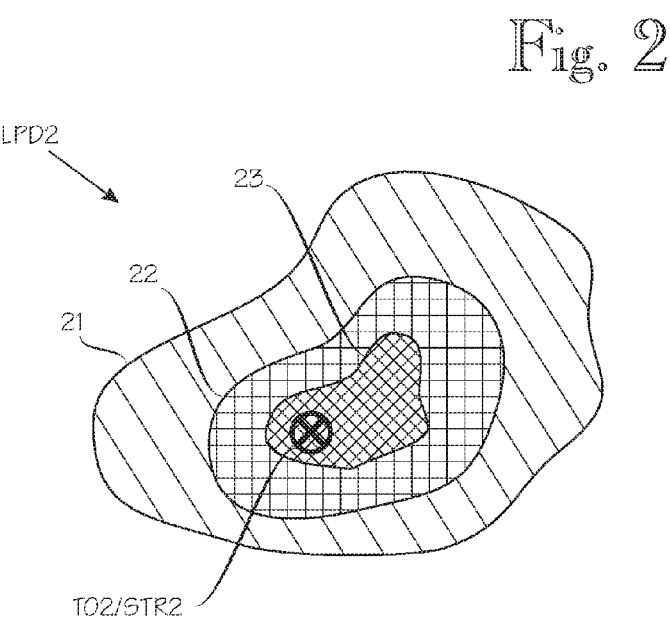
FIG. 2 shows the environment shown in FIG. 1 wherein positioning is based on observations made by a second target object.

FIG. 2 shows the environment shown in FIG. 1 wherein positioning is based on observations made by a second target object which in this example is assumed to be a palmtop computer or PDA. Because the PDA TO2 has better signal parameter observation capabilities than the tag TO1 had, the location probability distribution LPD2 for the second target object TO2 is simpler than the location probability distribution LPD1 for the first target object TO1 shown in FIG. 1. There is only one peak area 23 which is surrounded by a moderate-probability area 22 and a low-probability area 21, and the true location of the PDA TO2 resides in the high-probability area 23.

FIG. 3 illustrates how positioning ambiguity in respect of the first target object TO1 can be reduced or eliminated by using observations of the second target object TO2. Reference numeral 33 denotes a positioning-assisting signal sent by target object TO2 and received by target object TO1. FIG. 3 shows the two-peaked location probability distribution LPD1 for the first target object TO1 which was described in connection with FIG. 1. FIG. 3 is based on a simplistic assumption, which will be discarded later, that the position of the second target object TO2 (such as a PDA) can be determined accurately as a single point, denoted by reference numeral 31. It is possible to determine a perimeter 32 surrounding the PDA position 31, such that points along the perimeter indicate maximum-probability points for the tag TO1 to observe a transmission from the PDA TO2 at a given signal strength. FIG. 3 shows the perimeter 32 as a circle or ellipse but the inventive principle is not restricted to any particular shape. The perimeter 32 effectively reduces the positioning ambiguity in respect of the tag TO1 because the position of the tag TO1 is restricted by both its own location probability distribution LPD1 and the perimeter 31. Thus the region surrounding the second local peak 13B is eliminated altogether and the region surrounding the first peak 13A can be reduced significantly.

FIG. 4 shows how the perimeter shown in FIG. 3 can be generalized to an additional location probability distribution which can be used as additional information for reducing positioning uncertainty. Instead of a perimeter 32 indicating points of maximum probability, FIG. 4 shows an additional location probability distribution ALPD which comprises a high-probability zone 43 of areas, two medium-probability zones 42 and two low-probability zones 41. Specific embodiments for determining the addition location probability distribution will be discussed further in this document.

According to the invention, communication between the target objects TO1, TO2 is used to assist positioning. Let us first assume that the second target object TO2 (PDA) sends something which is observed by the first target object TO1 (tag), although the inventive principle is equally applicable to the reverse direction. Such signalling is denoted by reference numeral 33 and referred to by the term "positioning-assisting signal" because these signals are sent specifically to assist positioning. The positioning-assisting signal 33 sent by the PDA TO2 and observed by the tag TO1 yields the additional location probability distribution ALPD schematically shown in FIG. 4.

FIG. 5 shows how positioning uncertainty of target objects can be reduced by using a positioning-assisting signal sent from one target object to another. FIG. 5 shows an updated location probability distribution LPD1' for the tag TO1 which is determined by combining the first probability distribution LPD1 for the tag TO1 (shown in FIG. 1) and the additional location probability distribution ALPD (see FIG. 4) determined on the basis of the positioning-assisting signal from the PDA TO2 and observed by the tag TO1. A simple but effective way to combine the probability distribution is to multiply the probabilities for the locations and to normalize the results of the multiplication, such that the sum or integral over the probabilities is one. Multiplication followed by normalization is not the only way to combine the probability distributions, however. The tag's updated location probability distribution LPD1' comprises a high-probability area 53, surrounded by a medium-probability area 52 and a low-probability area 51.

Note that the invention is perfectly applicable to continuous probability distributions without any quantification to areas or zones, and the division of the probability distributions into high-, medium- and low-probability areas is purely arbitrary and intended to facilitate understanding and illustrating the invention.

Each time the tag TO1 observes the positioning-assisting signal sent by the PDA TO2, or vice versa, and the observation is conveyed to the positioning engine PE, the positioning engine is able to improve the estimates of both target objects TO1, TO2. As the distance between the target objects decreases, the stronger is the positioning-assisting signal from one target object observed by the other target object, which fact reduces the number of possible locations.

It was stated earlier, in connection with FIG. 4, that the simple ring-shaped form of the probability distribution 41, 42, 43 around the perimeter 32 was based on the simplistic assumption that the location of the PDA TO2 could be determined as a single point. In a real-world situation the probability distribution 41, 42, 43 tends to be more complex than the one shown in FIG. 4 but it still can be used to rule out impossible locations in the first location probability distribution LPD1. Even if the probability distribution 41, 42, 43 has multiple local peaks, most of the false peaks are likely to have a near-zero probability in the first location probability distribution LPD1.

Let us now reject the simplistic assumption that the location of the second target object could be determined as a single point. In one specific but non-restrictive embodiment, determination of the updated location probability distribution is based on an adaptation of a Bayesian approach to statistical inference. According to the Bayesian paradigm, observations are used to update the probability distribution over the domain of a variable of interest given the domain specific background knowledge. In the context of the present invention, the variable of interest is the location of the target object TO1 and the observations comprise measurements on the at least one location-dependent physical quantity O and the positioning assisting signal PAS. As background knowledge, the positioning engine or its designer can utilize everything which is known or can be assumed about the propagation of positioning-assisting signals within the environment. The locations of the target objects TO1 and TO2 can be assumed independent from one another prior to seeing any observations. The Bayesian paradigm suggests that the location of the target object TO1 can be estimated by evaluating or approximating the probability distribution $$p(L_1=l|O=o,\text{PAS}=a) \text{ for all } l \in \Lambda \quad [1]$$

where $L_1$ is a random variable representing location of the target object TO1 and $\Lambda$ is the set of all possible locations in the environment. The function in Eq. 1 is a posterior probability density distribution of the target object TO1 given the observations and the background knowledge. In this non-restrictive illustrative example, the updated location probability distribution of the target object TO1 (LPD1') can be interpreted to be the same object as the posterior probability distribution in equation 1. Next we will explain how LPD1, LPD2 and ALPD can be utilized in the evaluation process of the posterior probability distribution under the Bayesian paradigm. The posterior probability distribution of the target object TO1 can be calculated by marginalizing over the possible locations of the second target object TO2

$$p(L_1=l|O=o,\text{PAS}=a) = \int_{k \in \Lambda} p(L_1=l, L_2=k|O=o,\text{PAS}=a)dk \quad [2]$$

where $L_2$ is a random variable representing location of the target object TO2. In equation 2, the location of the target object TO2 is considered to be an auxiliary parameter, which is only needed to estimate the location of the target object TO1. Those skilled in the art will realize the identity in equation 2 can be factorized as $$\frac{\int_{k\in\Lambda} p(L_1 = l)P(L_2 = k)p(O = o \mid L_1 = l, L_2 = k)}{\int_{l'\in\Lambda}\int_{k'\in\Lambda} p(L_1 = l')P(L_2 = k')p(O = o \mid L_1 = l', L_2 = k')}$$
$$p(PAS = a \mid L_1 = l', L_2 = k')dk'dl'$$ , [5]

given that locations of the target objects TO1 and TO2 are modelled to be independent from one another prior to seeing any observations, where the denominator is a normalization constant which is independent from the location value l. Furthermore, if the probability distribution of the location-dependent physical quantity is independent from the location of the target object TO1, then it holds that the updated posterior probability density distribution of the location of the target object TO1, denoted by LPD1', is proportional to (up to a normalization constant)

$$p(L_1 = l) \int_{k\in\Lambda} p(L_2 = k)p(O = o \mid L_2 = k)p(PAS = a \mid L_1 = l, L_2 = k)dk$$ [3]

The terms $p(O=o|L_2=k)$ and $p(PAS=a|L_1=l, L_2=k)$ in equation [3] are the likelihood functions of the observed data. The term $p(O=o|L_2=k)$ is a likelihood function that quantifies how likely it is that the second target object TO2 is at the location k given the measurement of at least one location dependent physical quantity. Similarly, $p(PAS=a|L_1=l, L_2=k)$ is a likelihood function that describes how likely the positioning-assisting signal is, given that the combination of the locations of the target objects TO1 and TO2 are l and k, respectively. Possible embodiments for implementing the term $p(PAS=a|L_1=l, L_2=k)$ will be described in connection with FIGS. 8 and 9. Both of these likelihood functions are maintained by the positioning engine PE. The term $p(O=o|L_2=k)$ corresponds to the second location probability distribution LPD2 and the term given by equation [3] corresponds to the assisting location probability distribution (ALPD) in this illustrative example. The term $p(L_1=l)$ corresponds to the concept of first location probability distribution LPD1.

In alternate embodiments, the probability distribution $p(L_1=l|O=o, PAS=a)$, which corresponds to the updated first location probability distribution (LPD1'), or some of the terms that can be identified by factorizing equation [1], may be approximated by using computationally more attractive methods that produce results which may not be exactly correct but suffice in practical applications.

In further alternate embodiments, the features of the present invention can be combined such that some or all calculations relating to the determination of LPD1, LPD2, ALPD and LPD1', and to the creation of the location estimate for the first target object are combined into a single equation that is evaluated by the positioning engine PE. For instance, the following equation includes all these steps, wherein $TO1_{xy}$ is the estimated location of TO1 and $l_{xy}$ denotes the coordinates of location l.

$$TO1_{xy} = E(L_1 \mid O = o, PAS = a) = \int_{l\in\Lambda} l_{xy} p(L_1 = l \mid O = o, PAS = a) dl =$$

-continued
$$\frac{\int_{l\in\Lambda} l_{xy} p(L_1 = l) \int_{k\in\Lambda} p(L_2 = k)p(O = o \mid L_2 = k)}{\int_{l'\in\Lambda} p(L_1 = l') \int_{k'\in\Lambda} P(L_2 = k')p(O = o \mid L_1 = l', L_2 = k')}$$
$$p(PAS = a \mid L_1 = l', L_2 = k')dk'dl'$$

The returned location is a conditional expectation of the location of the first target object TO1 given the positioning-assisting signal value and the at least one location dependent physical quantity. The conditional expectation is a probability-weighted average of all possible locations for the first target object, wherein the probability/weight for location l is the density of the updated first location probability distribution at location l. Thus the above equation is may be used to semantically describe the present invention, although it may be difficult to recognize and distinguish the inventive features from the above equation.

Figure 6A:
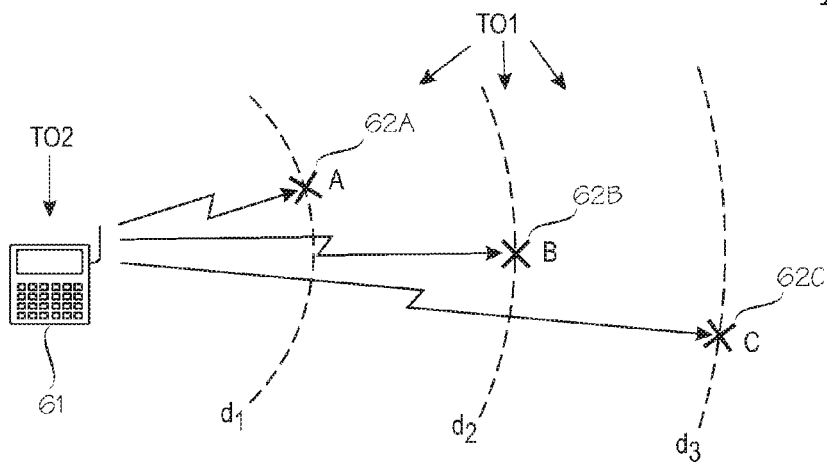
FIGS. 6A to 6C schematically depict a technique for modelling the expected strength of the positioning-assisting signal as a function of distance between the transmitter and the receiver.

In an illustrative but non-restrictive embodiment the likelihood function $p(PAS=a|L_1=l, L_2=k)$ is implemented as illustrated in FIGS. 6A-6C and 7A-7B. The objective is to model a probability distribution for the strength of the positioning-assisting signal when the locations of the target objects TO1 and TO2 are l and k, respectively. In FIG. 6A, reference sign 61 denotes a location of target object TO2, while reference signs 62A, 62B and 62C denote three different locations for target object TO1, such that the respective distance from TO2 is $d_1$, $d_2$ and $d_3$.

Figure 6B:
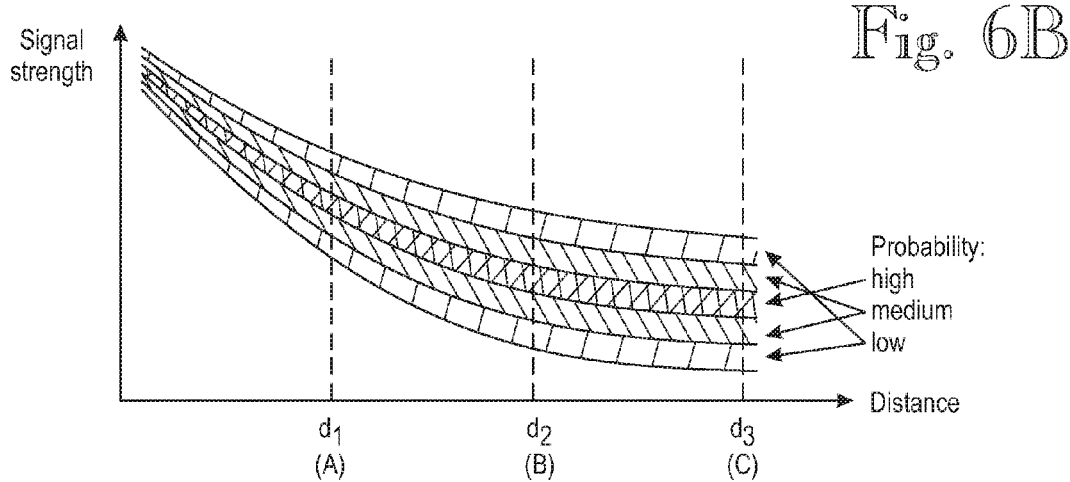
Figure 6C:
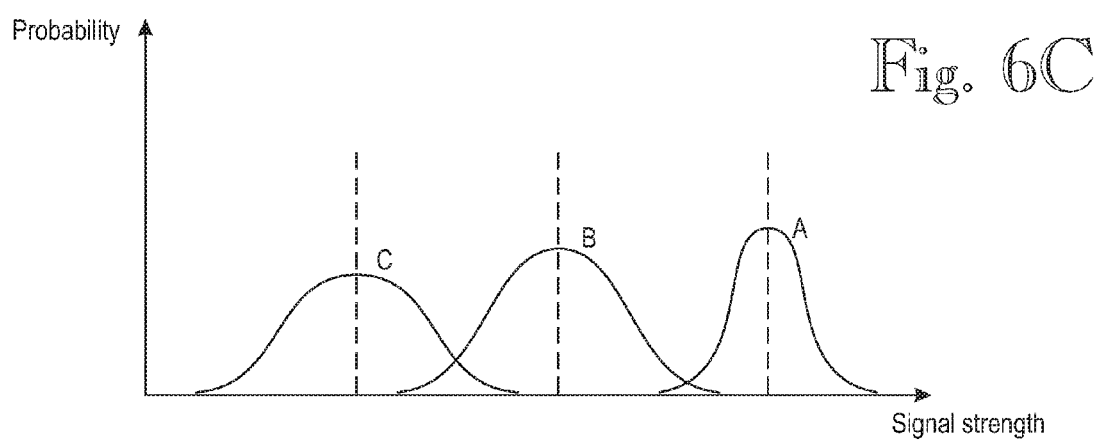

Such modelling can be implemented in two phases. In a first phase, the base level and variance of the signal strength is estimated according to the distance between the target objects. FIG. 6B shows a graphs of signal strength as a function of distance from target object TO2, while FIG. 6C shows the probability of an observation versus signal strength for the three TO1 locations 62A, 62B and 62C. FIGS. 6A to 6C collectively show an example of a signal strength model wherein the expected signal strength level decreases and the expected signal variance increases as the distance between the target objects increases.

Increasing the signal variance for longer distances simulates the overall uncertainty related to the signal propagation model. It is fairly easy to estimate a signal at a location close to the transmitter, but the number of things affecting the signal, such as reflections and blocking obstacles, increases rapidly as moving away from the transmitter making it practically impossible to model the signal precisely. Adding more variance into the signal strength distribution is an easy and elegant way to model the uncertainty.

Figure 7A:
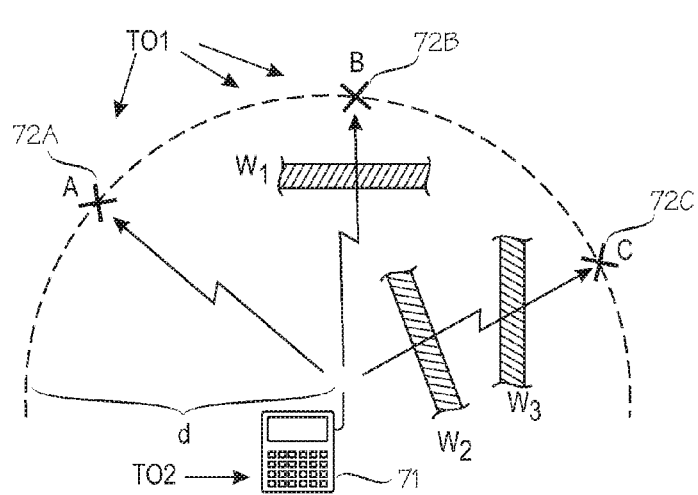
FIGS. 7A and 7B illustrates a technique for modelling the expected strength of the positioning-assisting signals, taking into account obstacles between the transmitter and the receiver.
Figure 7B:
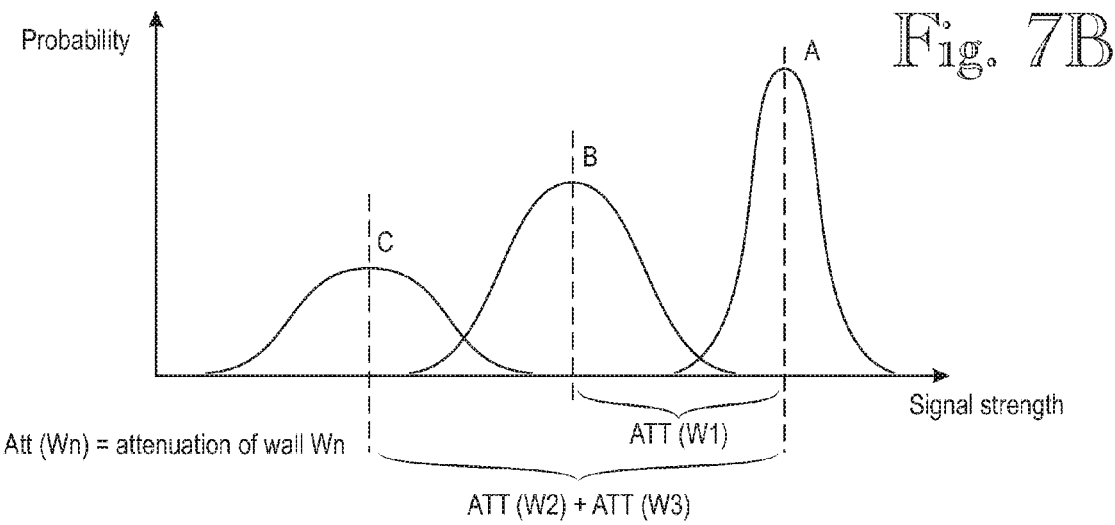

In a second, optional, phase, the signal strength distribution is further adjusted by taking into account obstacles between the target objects and affecting the signal. FIG. 7A shows three locations denoted by reference signs, 72A, 72B and 72C. These locations are equidistant from the target object TO2, but only location 72A has an unobstructed signal path from the location 71 of target object TO2, while signal reception at location 72B is affected by wall W1 and at location 72C by walls W2 and W3. FIG. 7B illustrates how the presence of walls W1 to W3 could affect the signal strength observed at locations 72A, 72B and 72C. ATT(Wn), wherein n=1, 2 or 3, denotes signal strength attenuation by wall Wn. Each time a signal passes through a wall or some other obstacle, the wall absorbs some of the signal energy, decreasing the signal strength level, and makes the signal strength more difficult to estimate, which is modelled by increasing the signal strength variance.

In more sophisticated embodiments, estimation of $p(PAS=a|L_1=l, L_2=k)$ may take into account other parameters that affect the positioning-assisting signals. For example, radio signals may reflect from walls or other obstacles causing multipath effects, which can significantly affect the observed signal strength level at some locations. Also, in case directional antennas are used, the angle of the signal and the orientation of the target objects should be taken into account. Some embodiments may also model dynamic changes in the environment such as moving obstacles or changing transmission powers. It should be apparent to a person skilled in art that the exact nature of the methods used to model the positioning-assisting signal is not essential for this invention.

Once the expected signal strength distribution has been determined for locations $L_1=l$, $L_2=k$, the probability $p(PAS=a|L_1=l, L_2=k)$ can be determined simply as the density of the signal strength distribution at point $PAS=a$.

Figure 8:
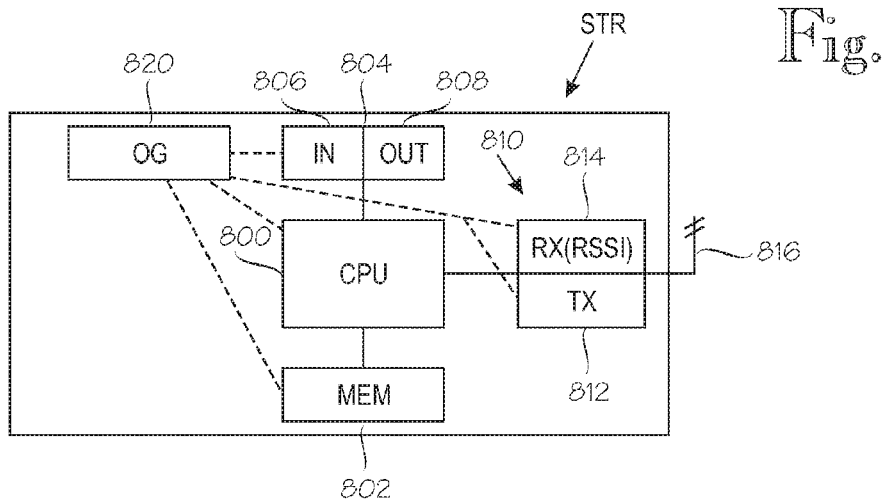
FIG. 8 is a schematic block diagram of a signal transceiver.

FIG. 8 is a schematic block diagram of a signal transceiver. The signal transceiver STR comprises a central processing unit (CPU) 800, memory 802, input-output circuitry 804 which consists of input circuitry 806 and output circuitry 808. The signal transceiver STR further comprises reception/transmission circuitry 810 which comprises a transmission circuitry 812, reception circuitry 814 and antenna 816. In many communication transceivers the reception circuitry 814 also comprises a received signal strength indicator RSSI. At this level of generalization, all elements 800 through 816 can be conventional as used in the relevant art.

In addition to conventional sections, the signal transceiver STR used in implementations of the present invention comprises an observation generation unit 820 which is coupled with the above-described elements as follows. The observation generation unit 820 is typically implemented via program routines stored in the memory 802. The execution of the program routines of the observation generation directs the CPU 800 to obtain readings from the RSSI indicator in the reception circuitry 814. The execution also directs the CPU 800 to send the observations via the transmission circuitry 812 to the communication network which relays it to the positioning engine PE (see FIGS. 1 and 9).

Instead of obtaining observations from the RSSI indicator or in addition to the RSSI, the observation generation unit 820 may process observations of some other radiometric quantity, such as bit error rate/ratio, timing advance or the like, or it may obtain the observations from other measurement circuitry which is operatively coupled to the input circuitry 806 and which, for example, is operable to measure an atmospheric, acoustic or optical quantity in the environment.

Figure 9:
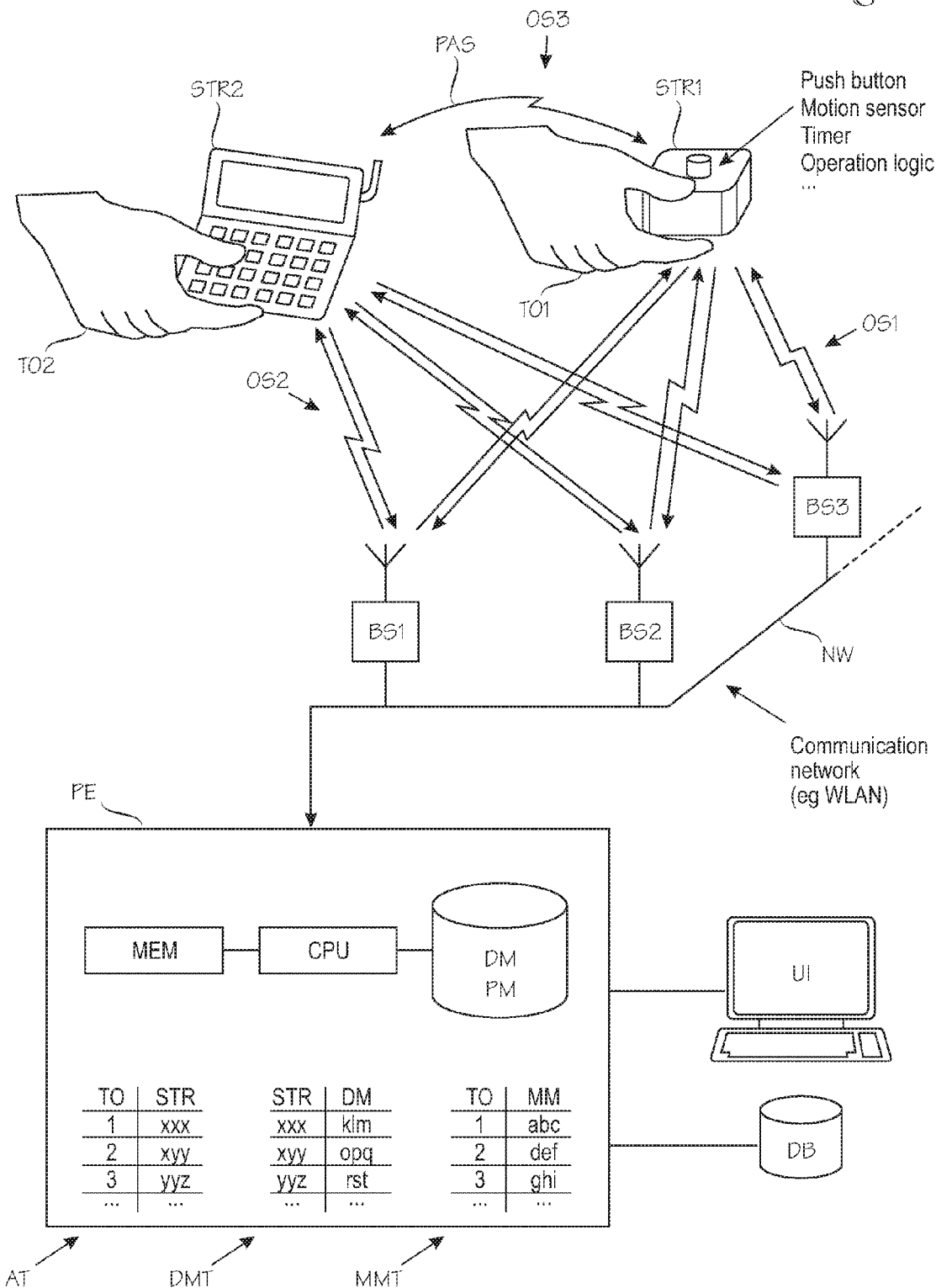
FIG. 9 schematically depicts a practical implementation of the invention.

FIG. 9 schematically depicts a practical implementation of the invention. The first and second target objects TO1, TO2 are depicted as hands of persons carrying respective signal transceivers (signalling devices) STR1, STR2. The basic features of a representative signal transceiver STR was described in connection with FIG. 8. The signal transceivers STR1, STR2 are coupled to a communication network NW, such as a WLAN network, which comprises several base stations BS1, BS2, BS3, etc. In this example the location-dependent physical quantity observed by both signal transceivers STR1, STR2 is signal strength from the base stations BS1-BS3. The dual arrows between the signal transceivers STR1, STR2 and the base stations BS1-BS3 indicate the fact that the observe strength from the base stations BS1-BS3 and use at least one of the base stations to send the observations to the positioning engine, which in this example is a centralized positioning server. The location of the first and second target object respectively influence the first and second observation sets OS1, OS2, both of which are examples of quantity observation sets. The relation of location vs. signal strength from the base stations is modelled in a data model DM in the positioning engine PE. The data model DM may indicate a calibrated value for each of several locations in the environment. In some embodiments the data model DM is a probabilistic model which indicates a probability distribution for the signal strength (or other location-dependent physical quantities) for each of several locations, called sample points. A probability distribution provides more information than a single calibrated or expected value and is more robust in cases wherein the observations are ambiguous or contradictory.

In the present example the first signal transceiver STR1 is a small positioning tag. To prolong battery life, the tag STR1 is designed to send observations only intermittently. There are several ways to implement such an intermittent transmission of observations. For instance, the tag may be provided with an operation logic which puts the timer on sleep mode for most of the time and wakes up the tag in response to timer alerts or activity detections from a push button or motion sensor. When the tag wakes up, it observes the signal strength or other location-dependent physical quantities and sends the observation(s) via the network NW to the positioning engine PE. Along with the observed value of the location-dependent physical quantities, the tag may also indicate the activity that triggered the sending of the observation. For instance, the person depicted as target object TO1 can press the push button to indicate that some attention or assistance is needed. That may serve as an indication that the tag and the person carrying it should be located as soon as possible.

The search of the tag STR1 is assisted by the second signal transceiver STR2 which is carried by another person depicted as target object TO2. The second signal transceiver STR2 is depicted as a pocket computer smart phone, herein called a PDA (for "personal digital assistant"). A typical PDA has more processing power and a bigger battery, which is why it can make more frequent observations than the tag STR1 can. The typical PDA also has a display and/or loudspeaker/headphone, which is why it can receive current positioning data or explicit motion instructions from the positioning engine and relay such information to its user.

Prior art positioning systems rely on modelling of at least one location-dependent physical quantity, such as signal strength, at several locations in the environment, called sample points. Although signal strength of transmissions by the base stations is a typical example of the location-dependent physical quantity, it is not necessary for the data model DM to know the locations of the base stations. But the locations of the sample points must be known. Some positioning techniques may rely on physical quantities other than signal strength, but it is common to reference the observations of a mobile target object against a data model which is based on sample points with known locations.

The present invention complements such prior art positioning systems by utilizing information which is based on observations from one or more positioning-assisting signals, one of which is denoted by reference sign PAS. The positioning-assisting signal PAS is sent by one signal transceiver, eg STR2, and received by another one, eg STR1. Neither the origin nor the destination of the positioning-assisting signal PAS is indicated by the data model or otherwise known a priori. The Invention is partially based on the somewhat surprising discovery that although neither the origin nor the destination of the positioning-assisting signal is known a priori, an observation of the positioning-assisting signal nevertheless provides useful information which is not properly utilized in prior art positioning systems. This is depicted as the third observation set OS3 which is based on the positioning-assisting signal PAS and is an example of a positioning-assisting observation set. To that end the positioning engine PE may be operatively coupled to a signal propagation model PM which indicates a signal value probability distribution as a function of a distance traveled by the signal. The signal propagation model may also take into account obstacles between the signal's originating and terminating locations in the environment. This information can be used to derive the additional location probability distribution ALPD shown in FIG. 4. The additional location probability distribution in turn can be used to resolve ambiguities regarding either target object's location, by producing the updated location probability distribution LPD1, as described in connection with FIG. 5. The positioning engine PE may comprise or be coupled with a user interface UI and or database DB. For instance, the positioning engine PE may output current location estimates, search statistics or the like on the display of the user interface UI. Alternatively or additionally the positioning engine PE may store observations, locations estimates and/or motion histories in the database DB.

The positioning engine may employ one or more tables which indicate various associations. As discussed in connection with FIG. 1, an association table AT links target objects to their associated and co-located transceivers. An optional device model table DMT associates signal transceivers with respective device models that compensate for the differences between different signalling devices' observations of signal quality parameters. The positioning engine or its operator may select among the multiple device models a specific device model for each specific signal transceiver. Device models are described in more detail in commonly-owned patent application WO2004/008796. The techniques described in WO2004/008796 can be used to that compensate for the differences between different signalling devices' observations of the any of the observations OS1 to OS3.

The positioning engine may also employ a motion model table MMT to indicate a motion model for each target object based on the target object's motion characteristics, as described in commonly-owned patent application EP 1 796 419. The motion models may be used to further resolve ambiguities by excluding impossible or highly improbable locations and transitions. Ambiguities may be resolved further by employing a graph which models the topology of the environment by indicating several nodes which are permissible locations in the environment and several arcs which are permissible transitions between two nodes. Creation and using of graphs is described detail in commonly-owned patent application WO2004/008795.

The invention is also applicable to positioning tasks in an environment comprising two or more target objects wherein only a few or none of the target objects can be located with adequate accuracy using observations on the location-dependent quantities. For instance, an ad-hoc network wherein only a few base stations are placed on fixed positions and the network clients communicate with each other to establish a communication network is an illustrative example of a case wherein target-specific observations may not be sufficient for accurate positioning, as illustrated in FIG. 10A. FIG. 10A shows a scenario in which a network or network section has three base stations A, B and C, denoted by respective reference signs 101A, 101B and 101C. FIG. 10A also shows three target objects TO2/1, TO2/2, and TO2/3, denoted by respective reference signs 102A, 102B and 102C each of which is able to observe only one of the base stations A, B and C. Unless directional antennas are used, the base stations' radiation patterns are substantially circular, which is why any given observed signal value is equally probable in all directions around a base station. Thus, the location probability distributions (LPD2/1, LPD2/2, LPD2/3) for the target objects are also substantially circular, which means that the positioning engine cannot reliably the directions between each of the target object TO2/1, TO2/2, and TO2/3 from their respective base stations A, B and C. FIG. 10A also shows a target object TO1, denoted by reference numeral 103, which is located too far away from all base stations to observe any of them.

FIG. 10B shows how the present invention can be used to locate the target object TO1 by using positioning-assisting signals PAS1, PAS2 and PAS3 transmitted by TO1 and received by target objects TO2/1, TO2/2 and TO2/3, although no prior knowledge or quantity observations related to TO1 is available. In the scenario shown in FIG. 10B, the target object TO1 corresponds to the first target object having a location probability distribution LPD1, and any of target objects TO2/1, TO2/2, or TO2/3 corresponds to the second target object TO2 having a location probability distribution LPD2, denoted in FIG. 10B as LPD2/1, LPD2/2 and LPD2/3. Reference signs PAS1, PAS2, or PAS3 correspond to the positioning assisting signal(s) PAS as observed by the target objects TO2/1, TO2/2 and TO2/3. In this scenario the steps of the inventive positioning method are performed at least once for each of the second target objects TO1/1, TO2/2 and TO2/3, resulting in three additional location probability distributions ALPD/1, ALPD/2, and ALPD/3, wherein ALPD/n is the additional location probability distribution determined for TO2/n, PASn and LPD2/n, n=1, 2 or 3.

As can be seen in FIG. 10B, the high-probability regions for all the three addition location probability distributions ALPD/1, ALPD/2, and ALPD/3, overlap at the true location of TO1. Thus, the positioning engine can determine an updated first location probability distribution and estimate the location of TO1 accurately by combining the additional location probability distributions. In practice, combining the distributions can be performed in three iteration steps. First, the positioning engine determines an updated first location probability distribution LPD1'/1 by combining ALPD/1 with the initial first location probability distribution LPD1 for the first target object wherein all locations are equally probable as nothing is known about the location of TO1 in advance. Next, the positioning engine uses LPD1'/1 in place of LPD1 when performing the next iteration and combines it with ALPD/2 to determine a further updated first location probability distribution LPD1'/2. Accordingly, in the third iteration, the positioning uses LPD1'/2 in place of LPD1 when combining it with ALPD/3 to determine the final updated first location probability distribution LPD'1/3 which is used to determine a location estimate for TO1.

FIG. 11 shows another example comprising similar iterative steps as in the previous example. The scenario shown in FIG. 11 comprises only two target objects, TO1 and TO2, but the positioning engine PE (see FIGS. 1 and 9) receives three positioning-assisting observation sets based on three positioning-assisting signals PAS1, PAS2 and PAS3 transmitted by the signalling devices associated with target object TO1 at different times denoted by t1, t2 and t3. The example shown in FIG. 11 is based on the assumption that the location of TO2 can be estimated fairly accurately and that the time intervals t2-t1 and t3-t2 between the positioning-assisting signals PAS1, PAS2 and PAS3 is long enough for TO2 to move to another location before receiving the next positioning-assisting signals PAS2 at time t2 and PAS3 at time t3. As can be seen in FIG. 11, none of the additional location probability distributions ALPD1, ALPD2 and ALPD3 determined on the basis of respective positioning-assisting signals PAS1, PAS2 and PAS3 alone suffices to determine the location of TO1 accurately. However, when the additional location probability distributions are combined by performing iterative steps similar to those described in connection with FIG. 10B, the final updated first location probability distribution reflects the true location of TO1 very accurately. In FIG. 11, the intersection ("∩") operator is shown as the operator being used to combine the additional location probability distributions ALPD1, ALPD2 and ALPD3 but other operators can be used, depending on the type of distribution (discrete or continuous, for example).

In an illustrative but non-restrictive embodiment, the positioning engine may send movement instructions to the second target object(s), guiding it/them to move to a location which helps find the first target object. In some embodiments, the instructions may be based on the received positioning-assisting observation sets, the current location probability distributions for the target objects, or both. In an alternate embodiment, the positioning engine controls a systematic search involving multiple target objects, wherein the positioning engine maintains a search map indicating the areas already visited by one or more target objects and the moving instructions point to a location not yet visited by any of the target objects.

For example, the movement of TO2 in FIG. 11 may have been instructed by the positioning engine. After each positioning-assisting observation set, the positioning engine can reduce the number of possible locations for TO1 and guide TO2 to move to a location on which the next received positioning-assisting signal is expected to reduce the number of possible locations even further. Finally, when most of the uncertainty related to the location of TO1 has been eliminated, the positioning engine can guide TO2 to move directly towards the estimated location of TO1 to actually find it.

It is readily apparent to persons skilled in the art that, as the technology advances, the inventive concept can be implemented in various ways. For instance, some of the examples described above used the convention that the first transceiver associated and co-located with the first target object is a low-cost positioning tag, while the second transceiver associated and co-located with the second target object is a general-purpose device with better observation capabilities, but the invention is not restricted to this setup, and the first and second transceiver can have equal observation capabilities.

A key feature of the invention is the fact that at least one signalling device co-located with a target object sends one or more positioning-assisting signals which are received by other signalling device(s). In a prior art positioning technique the maximum achievable positioning accuracy is limited by the set of observable location-dependent physical quantities within the positioning environment, because the location of a target object is estimated independently from other target objects using only quantity observations related to the target object. However, when using positioning-assisting signalling, the information available to the positioning engine increases proportionally to the number of target objects in the environment because every mutual observation between the target objects efficiently reduces the uncertainty concerning the locations of the target objects. In the present invention, the use of the positioning-assisting signals sent by the mobile signalling devices and received by other mobile signalling devices provides additional information that does not exist in prior art positioning techniques.

Thus the invention and its embodiments are not limited to the examples described above but may vary within the scope of the claims.

REFERENCE DOCUMENTS

1. WO02/054813 discloses methods and equipment for estimating a receiver's location in a wireless telecommunication environment.
2. WO03/102622 discloses techniques for locating a target in a wireless environment. The techniques use a plurality of submodels of the wireless environment, each submodel indicating a probability distribution for signal values at one or more locations in the wireless environment. The submodels are combined to a probabilistic model of the environment which indicates probability distributions for signal values in the environment.
3. WO2004/008796 discloses a location-determination technique which comprises determining a plurality of device models that compensate for the differences between different target objects' observations of signal quality parameters and selecting, among the multiple device models, a specific device model for a specific target object.
4. EP 1796419 discloses comprehensive techniques for modelling target object movement, including motion models.
5. WO2004/008795 discloses location-determination techniques which use a graph that models the topology of the target object's communication environment.

The above reference documents are commonly-owned patent applications the teaching of which is incorporated herein by reference.

The invention claimed is:

1. A method for determining a location estimate for a first target object in an environment which also comprises a second target object, the method comprising:
  maintaining a positioning engine which is operable to model at least one location-dependent physical quantity with a data model of the environment, wherein the at least one location-dependent physical quantity is influenced by the location of the second target object, and wherein the positioning engine is operable to determine location probability distributions for the first and second target object;
  associating the first and second target object respectively with a co-located first and second signalling device, wherein at least one signalling device comprises means for sending a positioning-assisting signal and another signalling device comprises means for receiving the positioning-assisting signal and means for making observations from the positioning-assisting signal;
  the positioning engine receiving observations on the at least one location-dependent physical quantity;
  at least one of the signalling devices sending a positioning-assisting signal, wherein the positioning-assisting signal is received by another signalling device which makes a positioning-assisting observation set from it and sends the positioning-assisting observation set to the positioning engine, wherein said at least one of the signaling devices and said other signaling device are associated and co-located with different target objects;
  the positioning engine making a quantity observation set based on the received observations on the at least one location-dependent physical quantity;
  the positioning engine determining a respective first and a second location probability distribution for the first and second target object, wherein at least the second location probability distribution is based on the data model and the quantity observation set;
  the positioning engine determining an updated first location probability distribution based on the first location probability distribution, the second location probability distribution and the positioning-assisting observation set;

the positioning engine determining the location estimate for the first target object based on the updated first location probability distribution; and the positioning engine triggering a physical action based on the location estimate for the first target object.

2. The method according to claim 1, wherein the physical action comprises outputting the location estimate for the first target object to a physical output device and/or physical storage.

3. The method according to claim 1, wherein the positioning-assisting signal is sent by the first signalling device and the positioning-assisting observation set is made and sent to the positioning engine by the second signalling device.

4. The method according to claim 1, wherein the positioning-assisting signal is sent by the second signalling device and the positioning-assisting observation set is made and sent to the positioning engine by the first signalling device.

5. The method according to claim 4, wherein the positioning assisting signal is sent as a response to a preceding positioning-assisting signal sent by the first signalling device.

6. The method according to claim 5, wherein a controller defines an operation logic for sending the preceding positioning-assisting signal and the preceding positioning-assisting signal is sent in response to a transmission request from the controller.

7. The method according to claim 6, wherein a controller adjusts the operation logic based on the positioning-adjusting observation set, wherein adjusting the operation logic comprises adjusting a time interval between consecutive transmission requests.

8. The method according to claim 7, wherein the second signalling device responds to the preceding positioning-assisting signal by sending the positioning signal only when there is an indicated need to assist positioning of the first target object.

9. The method according to claim 1, wherein the data model is a probabilistic data model which indicates a probability distribution for the at least one location-dependent physical quantity for each of several locations in the environment, and wherein the step of determining the location probability distribution for a target object comprises:

the positioning engine determines a probability for an observation of the at least one location-dependent physical quantity at a hypothetical location of the target object, based on the probability distribution for the at least one location-dependent physical quantity indicated by the data model at the target object's hypothetical location; and the positioning engine determines a density of the location probability distribution at the target object's hypothetical location based on the probability for the observation of the at least one location-dependent physical quantity at the target object's hypothetical location.

10. The method according to claim 9, wherein the estimating the updated first location probability distribution comprises:

estimating an additional location probability distribution for the first target object based on the second location probability distribution and the positioning-assisting observation set;

estimating the updated first location probability distribution by combining the first location probability distribution and the additional location probability distribution.

11. The method according to claim 10, wherein the estimating the additional location probability distribution comprises using a signal propagation model, wherein the signal propagation model is operable to estimate the likelihood of the positioning-assisting observation set for hypothetical locations of the target objects.

12. The method according claim 11, wherein the signal propagation model comprises taking into account obstacles within the environment affecting the positioning-assisting signal.

13. The method according to claim 1, wherein the positioning engine monitors a location estimate for one or more second target objects and progress of the positioning-assisting observation set as a function of the location estimate for the one or more second target objects and wherein the positioning engine further sends the one or more second target objects instructions for changing location based on the progress of the positioning-assisting observation set.

14. A positioning engine for determining a location estimate for a first target object in an environment which also comprises a second target object and wherein at least one location-dependent physical quantity is influenced by the location of the second target object, the positioning engine comprising:

a data model which models the at least one location-dependent physical quantity with of the environment, means for receiving observations on the at least one location-dependent physical quantity;

means for associating the first and second target objects respectively with a co-located first and second signalling device;

means for receiving observations on the at least one location-dependent physical quantity reflecting the location of the second target object;

means for receiving a positioning-assisting observation set made from a positioning-assisting signal which is sent by at least one of the signalling devices and received by another one of the signalling devices, wherein said at least one of the signaling devices and said other signaling device are associated an co-located with different target objects;

means for making a quantity observation set based on the received observations on the at least one location-dependent physical quantity;

means for determining a respective first and a second location probability distribution for the first and second target object, wherein at least the second location probability distribution is based on the data model and the quantity observation set;

means for determining an updated first location probability distribution based on the first location probability distribution, the second location probability distribution and the positioning-assisting observation set;

means for determining the location estimate for the first target object based on the updated first location probability distribution; and means for triggering a physical action based on the location estimate for the first target object.

15. A non-transitory and tangible computer-readable program carrier comprising a computer program product, wherein execution of the computer program product in a data processing system causes the data processing system to implement the positioning engine according to claim 14.

* * * * *